(12) United States Patent
Soliman et al.

(10) Patent No.: US 10,059,819 B2
(45) Date of Patent: Aug. 28, 2018

(54) BI-AXIALLY STRETCHED ARTICLE (71) Applicant: SAUDI BASIC INDUSTRIES CORPORATION, Riyadh (SA)

(72) Inventors: Maria Soliman, Schalbruch (DE); Johannes Peter Antonius Martens, Elsloo (NL); Frits Pieter Eduard Anton De Jong, Dresden (DE)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 252 days.

(21) Appl. No.: 14/403,490

(22) PCT Filed: May 30, 2013

(86) PCT No.: PCT/EP2013/061186
§ 371 (c)(1),
(2) Date: Nov. 24, 2014

(87) PCT Pub. No.: WO2013/178746
PCT Pub. Date: Dec. 5, 2013

(65) Prior Publication Data
US 2015/0118470 A1  Apr. 30, 2015

(30) Foreign Application Priority Data
May 31, 2012 (EP) ..................... 12004172

(51) Int. Cl.
*C08L 3/00* (2006.01)
*C08J 5/18* (2006.01)
(Continued)

(52) U.S. Cl.
CPC ............. *C08J 5/18* (2013.01); *B32B 23/08* (2013.01); *B32B 27/08* (2013.01); *C08L 3/00* (2013.01);
(Continued)

(58) Field of Classification Search
CPC ........ C08L 23/04; C08L 23/0846; C08L 3/00; C08L 2205/08; B32B 2307/518;
(Continued)

(56) References Cited

U.S. PATENT DOCUMENTS 5,082,616 A  1/1992  White et al.
5,415,827 A  5/1995  Tomka et al.
(Continued)

FOREIGN PATENT DOCUMENTS

CA  2060650 A1  10/1991
WO  2007118280 A1  10/2007
(Continued)

OTHER PUBLICATIONS

International Search Report for International Publication No. PCT/EP2013/061186; International Filing Date: May 30, 2013; dated Jul. 16, 2013; 6 Pages.
(Continued)

*Primary Examiner* — Amber R Orlando
*Assistant Examiner* — Lawrence Ferguson
(74) *Attorney, Agent, or Firm* — Cantor Colburn LLP (57) ABSTRACT

The present invention relates to a biaxially stretched article obtained by stretching a thermoplastic composition in a machine direction and a transverse direction at elevated temperature, said thermoplastic composition comprising a polyolefin phase containing at least one polyolefin, a starch phase containing thermoplastic starch, and at least one compatibiliser, wherein the article has a layered morphology with alternating layers of starch phase and polyolefin phase, said layers of starch phase and polyolefin phase extending in machine direction and transverse direction.

17 Claims, 5 Drawing Sheets

(51) Int. Cl.
*C08L 23/04* (2006.01)
*B32B 23/08* (2006.01)
*B32B 27/08* (2006.01)
*C08L 23/08* (2006.01)

(52) U.S. Cl.
CPC ......... *C08L 23/04* (2013.01); *B32B 2307/518* (2013.01); *B32B 2317/20* (2013.01); *B32B 2323/00* (2013.01); *B32B 2367/00* (2013.01); *C08J 2303/00* (2013.01); *C08J 2323/02* (2013.01); *C08J 2367/02* (2013.01); *C08J 2403/02* (2013.01); *C08J 2423/06* (2013.01); *C08J 2431/04* (2013.01); *C08J 2451/06* (2013.01); *C08L 23/0846* (2013.01); *Y10T 428/269* (2015.01); *Y10T 428/3179* (2015.04); *Y10T 428/3188* (2015.04)

(58) Field of Classification Search
CPC ............ B32B 2317/20; B32B 2323/00; B32B 2367/00; B32B 23/08; B32B 27/08; C08J 2303/00; C08J 2323/02; C08J 2367/02; C08J 2403/02; Y10T 428/269; Y10T 428/3179; Y10T 428/3188
USPC .................. 428/220, 339, 481, 507; 264/173
See application file for complete search history.

(56) References Cited

U.S. PATENT DOCUMENTS

| | | |
|---|---|---|
| 6,605,657 B1 | 8/2003 | Favis et al. |
| 6,958,369 B2 | 10/2005 | Berger et al. |
| 2007/0042207 A1 | 2/2007 | Berger et al. |
| 2008/0182113 A1 | 7/2008 | Hausmann et al. |
| 2009/0312462 A1 | 12/2009 | Oakley et al. |
| 2012/0009387 A1 | 1/2012 | Wang et al. |
| 2012/0150137 A1 | 6/2012 | Wang et al. |
| 2017/0021594 A1 | 1/2017 | Soliman et al. |

FOREIGN PATENT DOCUMENTS

| | | |
|---|---|---|
| WO | 2008037744 A2 | 4/2008 |
| WO | 2008037749 A2 | 4/2008 |
| WO | 2009022195 A1 | 2/2009 |
| WO | 2010012041 A1 | 2/2010 |
| WO | 2010131134 A2 | 11/2010 |
| WO | 2011009165 A1 | 1/2011 |
| WO | 2013178746 A1 | 12/2013 |
| WO | 2015071396 A1 | 5/2015 |

OTHER PUBLICATIONS

Written Opinion of the International Searching Authority for International Publication No. PCT/EP2013/061186; International Filing Date: May 30, 2013; dated Jul. 16, 2013; 5 Pages.

Example I

Figure 3b
MD  TD

Example II

Figure 3c
MD  TD

Example III

Figure 3d

Example IV

Figure 3e

Example V

Figure 3f

Example VI

Figure 3g

Example VII

Figure 3h

Example VIII

Figure 4a

MD                                       TD Example XIII

Figure 4b

MD                                       TD Example XIV

Figure 4c

MD                                       TD Example XV

BI-AXIALLY STRETCHED ARTICLE

CROSS REFERENCE TO RELATED APPLICATIONS

This application is a 371 of International Application No. PCT/EP2013/061186, filed May 30, 2013, which claims priority to European Application No. 12004172.8, filed May 31, 2012, both of which are hereby incorporated by reference in its entirety.

The present invention relates to a biaxially stretched article obtained by stretching a thermoplastic composition in a machine direction and a transverse direction at elevated temperature, said thermoplastic composition comprising a polyolefin phase containing at least one polyolefin, a starch phase containing thermoplastic starch, and at least one compatibiliser.

With an ever increasing emphasis on sustainability and the environment, there has been a corresponding increase in research directed toward developing polymeric materials derived from or comprising renewable biologically derived components.

Much of the research to date in developing such polymeric materials has focused on utilising naturally occurring bio-polymers such as starch. Starch is attractive in that it is derived from renewable resources (i.e. plant products), readily available and relatively inexpensive. However, the mechanical properties of starch in its native form are quite poor compared with those of petroleum derived (i.e. "synthetic") polymers. The mechanical properties of starch can be improved by melt mixing it with a plasticiser such as a polyhydric alcohol so as to form thermoplastic starch, sometimes abbreviated as TPS. However, the improved mechanical properties of thermoplastic starch still remain relatively poor compared with those of synthetic polymers. Thermoplastic starch is therefore not considered a viable alternative to petroleum derived polymers.

In attempt to derive the benefits of starch and petroleum derived polymers, a considerable amount or research has been directed toward developing blends of polyolefins and thermoplastic starch. However, combining relatively hydrophilic starch with polyolefins which are hydrophobic, to produce blends with good mechanical properties has proven difficult in practice. In particular, melt processing starch or TPS with polyolefins generally results in the formation of blends having a multi-phase discontinuous morphology.

WO2010/012041 discloses a composition comprising very low density polyethylene having a density of less than 0.905 g/cm$^3$, ethylene acrylic acid copolymer and thermoplastic starch and/or the constituent components thereof. Such compositions have been found to demonstrate excellent compatibility between the polymeric components as a blend and may be used to provide polymer products that exhibit excellent properties. Melt processed polymer compositions were found to exhibit desirable attributes such as low sensitivity to moisture, a surface amenable to printing, a high content of starch, excellent mechanical properties such as %-elongation. These desirable attributes are believed to stem at least in part from the ability of the compositions to provide the thermoplastic starch and polyethylene components in a highly compatibilised form. In some embodiments of the invention, the TPS and polyethylene components were believed to form stable a co-continuous phase morphology.

US 2012/0009387 discloses a flexible polymeric film comprising from about 5% to about 45% of a thermoplastic starch, from about 55% to about 95% of a polyolefin or mixtures of polyolefins, and from about 0.5% to about 8% of a compatibiliser, which has a non-polar backbone and a polar functional monomer or a block copolymer of both the non-polar block and a polar block, or a random copolymer of a polar monomer and nonpolar monomer. The thermoplastic starch in this film is incorporated as particles.

CA 2,060,650 discloses a single-layer or multiple-layer foil of substantially reduced gas-permeability which comprises at least one layer which consists, at least in part, of substantially thermoplastic starch. In order that this single layer or multiple-layer foil is at least approximately insensitive to moisture it is proposed that at least one layer comprises furthermore at least one hydrophobic polymer, such as a polyolefin, which is mixed with the starch upon the production of said at least one layer, and/or that the starch is at least partially cross-linked on the surface of said at least one layer and/or that said at least one layer is covered by at least one additional layer which is at least approximately insensitive to moisture.

WO2009/022195 discloses compositions comprising a polyolefin, a compatibiliser, a starch and a plasticizer. Said compositions may be used to manufacture a film material.

U.S. Pat. No. 6,605,657 discloses a composition of matter comprising a co-continuous blend of thermoplastic starch and synthetic polymer, wherein the co-continuous blend comprises a mixture of a thermoplastic starch phase and a synthetic polymer phase, and wherein both thermoplastic starch and synthetic polymer phases, when considered separately, are essentially constituted of a network of interconnected domains of thermoplastic starch and synthetic polymer, respectively, and wherein said composition is substantially water free. The synthetic polymer may be polyethylene.

WO 2011/009165 discloses a multilayer film comprising at least a tri-layer structure, said tri-layer structure being made up of a core polymer layer interposed between two covering polymer layers that each comprises polyethylene, wherein the core polymer layer comprises a melt blend of polyethylene, thermoplastic starch, and ethylene acrylic acid copolymer.

U.S. Pat. No. 5,415,827 discloses a process for improving the quality and particularly the mechanical properties of single- or multi-ply sheets with at least one ply consisting at least in part of essentially moisture-free thermoplastically processable starch, which is the melted mixture product of essentially moisture-free starch and an additive having a solubility parameter of over 15 cal$^{1/2}$ cm$^{-3/2}$, a vapor pressure of lower than 1 bar in the melting range of the starch/additive mixture, and which lowers the melting point of the starch so that the melting point of the starch/additive mixture lies below the decomposition temperature of the starch, characterized by the fact that the materials used to form the plies are dried before or during production of the sheets at least to the point where they are essentially moisture-free, the sheets are produced and the produced sheets are thereafter stretched mono-axially or biaxially. The ply containing the starch can either consist basically almost entirely of thermoplastically processable starch or else consist of a polymer blend containing thermoplastically processable starch and at least a polyolefin such as polyethylene or polypropylene, and preferably a phasing or bonding agent in the form of a block copolymer. After these single- or multi-ply sheets have been produced, they should be stretched mono-axially or biaxially, which stretching may be carried out at room temperature.

US2008/0182113 discloses a composition comprising a biopolymer, an olefin copolymer, and an optional polymer.

The biopolymer may be modified starch and is present in an amount of at least 85% based on the dry weight of the composition. The olefin copolymer may be a copolymer of ethylene and maleic anhydride. The optional polymer includes ethylene copolymer, polyvinyl butyral copolymer, or combinations thereof; the ethylene copolymer includes ethylene alkyl(meth)acrylate copolymer, ethylene vinyl acetate copolymer, ethylene acid copolymer or ionomer thereof, poly(vinyl alcohol), poly(hydroxyalkanoic acid), polyester, polyamide, polyurethane, polyolefin, polycaprolactone, copoly-ether-ester, polyalkylene oxide, or combinations of two or more thereof. The compositions may be formed into films and sheets by extrusion to prepare both cast and blown films.

An object of the present invention is to provide a thermoplastic composition in the form of an article having a multi-layered structure comprising layers of starch and polyolefin which article can be produced directly from said thermoplastic composition, i.e. which production does not require co-extrusion or lamination of multiple layers.

A further object of the present invention is to provide a bi-axially stretched article that exhibits a desirable combination of at least some of printability, low oxygen permeability, low water vapour permeability and acceptable mechanical properties.

Yet a further object of the present invention is to provide a multilayer film having layers of thermoplastic starch and layers of polyolefin, which layers do not delaminate.

A particular object of the present invention is to provide a bi-axially stretched article that exhibits the combination of both low oxygen permeability and low water vapour permeability.

To that extent the present invention is directed to a biaxially stretched article obtained by stretching a thermoplastic composition in a machine direction and a transverse direction at elevated temperature, said thermoplastic composition comprising
   a polyolefin phase containing at least one polyolefin,
   a starch phase containing thermoplastic starch
   at least one compatibiliser,
wherein the article has a layered morphology with alternating layers of starch phase and polyolefin phase, said layers of starch phase and polyolefin phase extending in machine direction and transverse direction. The skilled person will understand that since the article is obtained from the thermoplastic composition it is in fact the thermoplastic composition after being stretched that has the layered morphology so that, said in another way, the present invention is directed to a biaxially stretched article obtained by stretching a thermoplastic composition in a machine direction and a transverse direction at elevated temperature, said thermoplastic composition comprising
   a polyolefin phase containing at least one polyolefin,
   a starch phase containing thermoplastic starch
   at least one compatibiliser,
wherein the thermoplastic composition, after being stretched, has a layered morphology with alternating layers of starch phase and polyolefin phase, said layers of starch phase and polyolefin phase extending in machine direction and transverse direction.

Unlike the prior art the present invention provides a multi-layer structure of thermoplastic starch polyolefins without the need for a multilayer lamination or co-extrusion step. The properties of the article of the present invention are similar or even improved over known multilayer materials.

In particular the present inventors found that as a result of the layered morphology the article of the present invention may provide the desirable combination of low oxygen permeability and low water vapour permeability. Such combination cannot be obtained for polyolefins as such. For example, it is known that polyethylene has a relatively low water vapour permeability, yet the oxygen permeability is too high. For certain applications this requires the polyethylene to be part of a multi-layer foil, which is less cost-effective. In addition, the thermoplastic starch content in the article of the present invention introduces more polarity, resulting in a lower surface tension which is a desirable property in view of printability. The article of the present invention therefore obviates, or at least reduces the need for surface treatment of the article prior to printing. The present inventors have further found that the article shows acceptable mechanical properties which the present inventors ascribe mainly to the presence of the at least one compatibiliser which enhances the bond between the starch phase and the polyolefin phase.

Accordingly the article of the present invention meets at least some of the aforementioned objects.

The term layered morphology with alternating layers as used herein is intended to mean a morphology wherein layers of starch phase and polyolefin phase are observed predominantly in alternating stacked formation seen in MD and TD and wherein the layers extend in machine direction and transverse direction, meaning that the layers of polyolefin and thermoplastic starch form substantially continuous layers seen in machine direction and transverse direction and are not a mere combination of isolated domains in said directions.

A skilled person will nevertheless understand that some isolated domains of thermoplastic starch and/or polyolefin may nevertheless be formed during the production of the article according to the present invention. Such isolated domains will however form a minor part of the article of the present invention, typically in an amount less than a few weight percent, such as for example less than 5 wt %, preferably less than 3 wt %, more preferably less than 1 wt %. Ideally there are no isolated domains of starch phase and/or polyolefin phase and the respective layers are continuous in both machine direction and transverse direction.

In an embodiment the present invention relates to a biaxially stretched article obtained by stretching a thermoplastic composition in a machine direction and a transverse direction at elevated temperature, said thermoplastic composition consisting of:
   a polyolefin phase containing at least one polyolefin, and
   a starch phase containing thermoplastic starch and
   at least one compatibiliser,
wherein the article, i.e. the thermoplastic composition after being stretched, has a layered morphology with alternating layers of starch phase and polyolefin phase, said layers of starch phase and polyolefin phase extending in machine direction and transverse direction.

In a preferred embodiment the thermoplastic composition that is used to produce the article of the present invention comprises from 10-70 wt % of at least one polyolefin, from 10-70 wt % of thermoplastic starch and from 5-40 wt % of at least one compatibiliser.

Without wishing to be bound to it, the present inventors believe that In order to obtain the layered morphology with alternating layers of starch phase and polyolefin phase a balance need to be found in the type, amount and properties of the polyolefin phase, type amount and properties of the starch phase and type amount and properties of the compatibiliser. In addition to that the thermoplastic composition needs to be stretched in machine direction and in transverse direction to a certain extent.

In a preferred embodiment of the present invention therefore, the thermoplastic composition comprises a polyolefin phase and a starch phase in a weight ratio of from 0.8-1.2, preferably from 0.9-1.1, more preferably from 0.95-1.05. The present inventors observed that outside these ranges a layered morphology will nevertheless be possible.

Preferably a stretch ratio in transverse direction is at least 1.5, preferably at least 2, the stretch ratio in transverse direction being defined as:

$$SR_{td} = \frac{W_1}{W_0}$$

and/or a stretch ratio in machine direction is at least 2, the stretch ratio in machine direction being defined as:

$$SR_{md} = \frac{T_0}{T_1 \times SR_{td}}$$

wherein
$SR_{md}$=Stretch ratio in machine direction
$SR_{td}$=Stretch ratio in transverse direction
$W_0$=Width of the thermoplastic composition before stretching in transverse direction [mm]
$W_1$=Width of the biaxially stretched article [mm]
$T_0$=Thickness of the thermoplastic composition before stretching in machine and transverse direction [mm]
$T_1$=Thickness of the biaxially stretched article [mm]

The stretch ratio in machine direction may also be defined based on the specifics of the process that is used for the stretching. For example in a film blowing process the stretch ratio in machine direction may be defined as the ratio between the speed of the film take up reel and the speed of the thermoplastic composition exiting the extrusion die.

In a more preferred embodiment both the stretch ratio in machine direction and the stretch ratio in transverse direction are at least 2.

Preferably the stretch ratio in machine direction is at most 20, more preferably at most 15, even more preferably at most 10. The stretch ratio in transverse direction is preferably at most 4.

For the avoidance of doubt it is to be understood that the stretch ratios as herein defined by definition are more than 1, i.e. the thermoplastic composition is required to be stretched in both machine direction and transverse direction. Similarly a "biaxially stretched" article by definition means an article that has been stretched in both machine direction and transverse direction. The stretching is carried out while the thermoplastic composition is at an elevated temperature and is essential in obtaining the layered morphology of the article according to the present invention. The stretching in machine direction and transverse direction is normally carried out simultaneously.

In view of the starch phase the temperature of the thermoplastic composition while being stretched may not be too high, because a too high temperature will cause yellowing or browning of the thermoplastic starch. The thermoplastic starch may also become brittle at too high temperatures, which is undesirable. A practical upper limit is 130° C. The lower temperature limit for the stretching depends to some extent on the thermoplastic composition, but in general it can be said that the lower limit is determined by the melting and crystallization temperature of the polyolefin phase. A practical lower limit may be 100° C., although a skilled person may easily find the practical lower limit by routine experimentation. Preferably the stretching of the thermoplastic composition is performed at a temperature above the melting points of both the thermoplastic starch and the polyolefin.

The present invention is not limited to a specific stretching process, yet it is preferred to use a film blowing technique, as such techniques are very suitable for making thin films. However other stretching techniques such as calendering may also be applied. The present invention does not exclude injection moulding processes for producing the inventive article per se, provided however that the thermoplastic composition is stretched in both a machine and transverse direction. Further variables of the injection moulding process may need to be considered for successfully producing the article of the present invention.

Preferably the viscosity of the starch phase is such that it has a Melt Flow Index (MFI) of from 2-20 preferably from 4-10 g/10 min measured in accordance with ISO 1133 at a temperature of 130° C. and under a load of 10 kg.

Preferably the viscosity of the polyolefin phase is such that it has a Melt Flow Index (MFI) of from 2-20 preferably from 4-10 g/10 min measured in accordance with ISO 1133 at a temperature of 130° C. and under a load of 10 kg.

The ratio of the MFI of the polyolefin phase and the MFI of the starch phase, both measured in accordance with ISO 1133 at a temperature of 130° C. and under a load of 10 kg is preferably from 0.5-1.5, preferably from 0.7-1.3, more preferably from 0.9-1.1. The present inventors have observed that the closer the ratio is to 1 the easier it is to obtain the layered morphology of the article according to the present invention.

The term compatibiliser as used herein is defined as a material having affinity with both the starch phase and the polyolefin phase and which material is able to improve the adhesion of the two phases at the interface so that the thermoplastic phase and the polyolefin phase can co-exist in the same article without the phases becoming physically separated. Hence in the article according to the present invention wherein the starch phase and the polyolefin phase are in the form of layers, the layers adhere well to one another and do not easily delaminate. Without willing to be bound to it the present inventors believe that without the compatibiliser the surface tension of interface between the starch phase and the polyolefin phase would be too high and that as a result thermodynamics will be the driving force towards a minimized contact surface area between the two phases, which is contrary to the formation of layers extending in machine and transverse direction which by nature will result in a significant contact surface area. Due to its nature a compatibiliser will predominantly be present at the interface between the starch phase and the polyolefin phase. Depending on the type of compatibiliser, a part of the compatibiliser may predominantly exits in the polyolefin phase, whereas another part may predominantly exist in the starch phase. Examples of this type of compatibilisers are block copolymers having polar and non-polar blocks. Alternatively the compatibiliser exists predominantly in either the starch or the polyolefin phase and merely contacts or bonds to the polyolefin or starch phase (as the case may be) at the interface between the two phases. Examples of this type of compatibilisers are maleic anhydride grafted polyolefins.

The skilled person will understand that the compatibiliser will not form a separate phase in the biaxially stretched article.

Due to the non-polar nature of the polyolefin phase and the polar nature of the starch phase compatibilisers may be polymer materials having a non-polar backbone and a polar group incorporated in the backbone or grafted thereon. Such polar group may be reactive with respect to the starch and react with at least a part of the starch. Compatibilisers may also be block copolymers having blocks of non-polar and polar monomers.

Suitable compatibilisers are ethylene acrylic acid copolymers, ethylene vinyl acetate copolymers, polyolefins having at least 1 wt % maleic anhydride grafted thereon, ethylene vinyl alcohol copolymers, block saponified polyvinyl acetate, random terpolymers of ethylene, butylacrylate and maleic anhydride, random, partially hydrolised and saponified polyvinylacetate or mixtures of at least two of these compatibilisers.

A partially hydrolysed and saponified polyvinyl acetate may be obtained by the method disclosed in U.S. Pat. No. 6,958,369 which method, including its variations as so disclosed, is explicitly incorporated by reference herein. This partially hydrolysed and saponified polyvinyl acetate obtained by hydrolizing and saponifying polyvinyl acetate in the presence of catalytic additions of low-molecular organic mono-, di- and trihydroxyl compounds (e.g. methanol, ethanol, ethylene glycol, glycerol) with a continuous addition of basically reacting compounds and an alkali silicate. More in detail the process for producing a partially hydrolysed and saponified polyvinyl acetate may comprise the steps of
  a) providing an aqueous dispersion of polyvinyl acetate;
  b) adding a catalyst, selected from the group consisting of mono-hydroxy compounds, di-hydroxy compounds and tri-hydroxy compounds, to the aqueous dispersion;
  c) optionally presaponifying the aqueous dispersion of polyvinyl acetate by adding an alkaline substance to the aqueous dispersion;
  d) providing an alkali silicate solution;
  e) reacting in a batch mixer the presaponified polyvinyl acetate of step c) with the alkali silicate solution of step d) by adding, while stirring, the alkali silicate solution to the presaponified polyvinyl acetate of step c) over a period of at least one hour to form organosilicates, wherein a combined water contents of the presaponified polyvinyl acetate and of the alkali silicate solution is greater than 40%.

Preferably in step c) the alkaline substance is continuously added until a degree of hydrolysis of 10% to 40% is reached and wherein in the step e) the reaction is carried out until a final degree of hydrolysis of 30% to 85% is reached.

Preferably in step c) the alkaline substance is calcium hydroxide which is added until a degree of presaponification of 10% to 40% has been reached.

The amount of compatibiliser is preferably in the range of from 15-30 wt % based on the thermoplastic composition.

The thermoplastic starch used in the article of the present invention may be made from any suitable starch source such as corn, tapioca, maize, wheat, rice, potato, soy bean or any combination of at least two of these starch sources, potato starch being preferred because of its availability.

Those skilled in the art will appreciate that thermoplastic starch is a de-structured form of starch comprising one or more plasticisers. Hence, for the avoidance of doubt it should be understood that processing aids, such as plasticisers, required for making thermoplastic starch out of starch are considered as part of the thermoplastic starch.

Starch is found chiefly in seeds, fruits, tubers, roots and stem pith of plants, and is a naturally derived polymer made up of repeating glucose groups linked by glucosidic linkages in the 1-4 carbon positions. Starch predominantly consists of amylose, a substantially linear polymer with molecular weight of about $1 \times 10^5$ and amylopectin, a highly branched polymer with very high molecular weight of the order $1 \times 10^7$.

Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%.

Besides the native form of starch, a chemically modified starch may also be used in the present invention. Chemically modified starch includes, but is not limited to, oxidised starch, etherificated starch, esterified starch or a combination of such chemical modifications (e.g. etherificated and esterified starch). Suitable etherificated starch includes, but is not limited to starch that is substituted with ethyl and/or propyl groups. Suitable esterified starch includes, but is not limited to starch that is substituted with actyl, propanoyl and/or butanoyl groups.

Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch is designated as 0 and can range up to 3 for a fully substituted modified starch. Depending upon the type of substituent and the DS, a chemically modified starch can exhibit considerably different hydrophilic/hydrophobic character relative to native starch.

Both native and chemically modified starch generally exhibit poor thermoplastic properties. To improve such properties, the starch may be converted to thermoplastic starch. For example, native or chemically modified starch may be melt processed with one or more plasticisers. Polyhydric alcohols may be used as plasticisers in the manufacture of thermoplastic starch.

The thermoplastic starch will generally also comprise one or more polyhydric alcohol plasticisers. Suitable polyhydric alcohols include, but are not limited to glycerol, ethylene glycol, propylene glycol, ethylene di-glycol, propylene di-glycol, ethylene tri-glycol, propylene tri-glycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, mannitol, sorbitol, and the acetate, ethoxylate, and propoxylate derivatives thereof.

In one embodiment the thermoplastic starch comprises glycerol and/or sorbitol plasticisers. The plasticiser content of the thermoplastic starch will generally range from about 5 wt % to about 50 wt %, for example from about 10 wt. % to about 40 wt % or from about 10 wt. % to about 30 wt %, relative to the combined mass of the starch and plasticiser components.

Although the present invention is primarily directed to the use of starch as a component for the article, the present inventors do not exclude the use of flour instead of starch, starch being a major constituent of flour.

The polyolefin in the article of the present invention is preferably selected from the group consisting of propylene homopolymers, ethylene propylene copolymers, polyethylene, high density polyethylene, medium density polyethylene, low density polyethylene, linear low density polyethylene and mixtures of at least two of the preceding polyolefins. Preferably the density of the polyolefin is at least 0.910 g/cm$^3$. For the avoidance of doubt it will be understood by the skilled person that the polyolefin phase is not limited to homophasic materials, but that the polyolefin phase may also be heterophasic for example when an ethylene propylene copolymer is dispersed in a propylene homopolymer. In a preferred embodiment the polyolefin polyethylene, in particular low density polyethylene or LDPE.

In an embodiment the thermoplastic composition further comprises a thermoplastic polyester, preferably poly(butylene terephthalate-co-adipate) in an amount of from 20-60 wt % based on the thermoplastic composition. The preferred compatibiliser in this embodiment is a partially hydrolised saponified polyvinylacetate as disclosed in U.S. Pat. No. 6,958,369.

The polyester may form a co-continuous morphology with the thermoplastic starch so that in this embodiment the starch phase will comprise the thermoplastic starch, the thermoplastic polyester and at least part of the compatibiliser. It is believed that this embodiment results in a less polar starch phase which makes compatibilisation with the non-polar polyolefin phase more easy. To further improve the adhesion between the starch phase including the thermoplastic polyester and the polyolefin phase it is preferred that the thermoplastic composition comprises a further compatibiliser which is a polyolefin, preferably polyethylene, having at least 1 wt % and preferably at most 10 wt % maleic anhydride grafted thereon. In another embodiment the thermoplastic starch and the thermoplastic polyester do not form a co-continuous structure, but the thermoplastic polyester will, upon stretching, in machine direction and transverse direction form layers extending in the aforementioned directions, similar to the layers that the polyolefin phase form. In this specific embodiment the article hence comprises three layers that are stacked in random yet alternating manner. For example a layer of thermoplastic starch phase may be covered with a layer of thermoplastic polyester which in turn is covered by a layer of polyolefin phase. Alternatively the layer of thermoplastic starch phase may be covered by a layer of polyolefin phase which in turn is covered by a layer of thermoplastic polyester.

Preferably the article according to the present invention is a film having a preferred thickness of from 2-250 μm and having a modulus of at least 50 MPa as measured according to ASTM 882 and an elongation at break of at least 200% as measured according to ISO 527-3.

The article, in particular the film, according to the present invention preferably has a coefficient of permeability for oxygen of at most 50 more preferably at most 25, most preferably at most 10 (g·mm/m$^2$·day) (cm$^3$·mm)/(m$^2$·day) as measured according to ASTM D-3985 (23° C., 0% RH, 100% O$_2$) on a film having a thickness of from 50-150 μm.

The article, in particular the film according to the present invention preferably has a coefficient of permeability for water vapour of at most 50, more preferably at most 25, most preferably at most 10 (g·mm/m$^2$·day) as measured according to ASTM F-1249 (38° C., 100% RH) on a film having a thickness of from 50-150 μm.

The present invention further relates to a multilayer film comprising the article according to the present invention in the form of a film which is provided with at least one further synthetic film of a synthetic polymer extending in machine direction and transverse direction. In a preferred embodiment of such a multilayer film both an upper and a lower side of the inventive article in the form of a film are provided with a synthetic film. The synthetic polymer is preferably a polyolefin, such as polyethylene. Such further synthetic film may be provided on the inventive article by means of lamination or co-extrusion prior or after stretching in machine direction and transverse direction.

The article of the present invention may be produced either by providing a thermoplastic composition comprising at least one polyolefin, thermoplastic starch and at least one compatibiliser and feeding said thermoplastic composition to an extruder, extruding the thermoplastic composition through an extrusion die and stretching the thermoplastic composition upon exiting the extrusion die at elevated temperature in machine direction and transverse direction. In this embodiment the thermoplastic composition is preferably fed to the extruder in the form of pellets of the thermoplastic composition, which pellets were prepared in a separate extrusion process preceding the method for producing the article. Alternatively the article may be prepared by feeding a polyolefin or a mixture of two or more polyolefins, starch, at least one processing aid for making thermoplastic starch and at least one compatibiliser to an extruder, extruding these components under such conditions that a thermoplastic composition comprising at least one polyolefin, thermoplastic starch and at least one compatibiliser is formed in the extruder and stretching the thermoplastic composition upon exiting the extruder at elevated temperature via an extrusion die in machine direction and transverse direction.

The present inventors have observed that if the article according to the present invention is prepared using a two-step process, wherein in a first step pellets of the thermoplastic composition are produced, and wherein in a second step the pellets are fed to a device for processing said pellets into the article, that the pellets may show a more or less co-continuous structure (morphology) of the starch and polyolefin phase. Some pellets also showed some alternating layers of starch phase and polyolefin phase.

The starch that is used in the process of the present invention is preferably used as such and is not dried or otherwise treated before being processed to thermoplastic starch.

The temperature during the extrusion process preferably does not exceed 180° C., more preferably 160° C. When exiting the extrusion die the thermoplastic composition is preferably at most 130° C.

The present invention further relates to a thermoplastic composition comprising:
  from 10-70 wt % polyolefin, preferably polyethylene, more preferably low density polyethylene (LDPE)
  from 10-70 wt % of thermoplastic starch
  from 5-40 wt % of at least one compatibiliser being a partially hydrolised and saponified polyvinylacetate as herein disclosed,
  from 20-60 wt % of a thermoplastic polyester, preferably poly(butylene terephthalate-co-adipate),
  all weight percentages based on the total weight of the composition.

Preferred embodiments of such thermoplastic compositions, where applicable, are similar to the preferred embodiments of the article of the present invention as herein disclosed.

The present invention will now be further explained by the following non limiting Figures and Examples.

Figure 1:
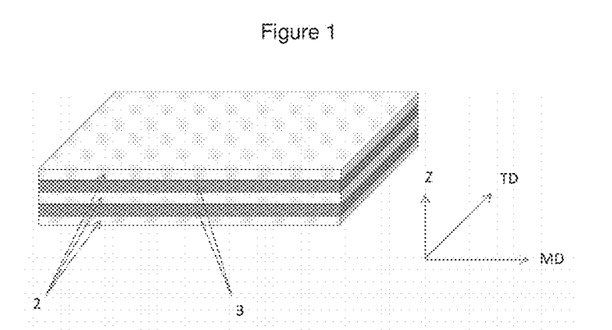
FIG. 1 shows a model of the layered morphology of the article according to the present invention.

FIG. 1 is a schematic representation of a biaxially stretched article 1 according to the present invention. The machine direction is indicated as MD, the transverse direction is indicated as TD and the thickness direction is indicated as Z. From FIG. 1 it is clear that the layers 2,3 extend in machine direction and transverse direction. The layers indicated with reference numeral 2 represent the polyolefin phase whereas the layers indicated with reference numeral 3 represent the starch phase. As can be clearly seen layers 2 and layers 3 alternate, i.e. the polyolefin phase layers 2 are stacked with the starch phase layers 3 in an alternating manner. The number of layers 2,3 predominantly depends on stretch ratios, thickness of the article and the thermoplastic composition. Article 1, not to scale, shows five layers 2,3 but the skilled person will understand that article 1 according to the present invention is not limited to such number of layers. In FIG. 1 the outer layers (i.e. the layers on the top and on the bottom of the stack) are shown to be layers of polyolefin. However, the present inventors have established that such outer layers may also be of thermoplastic starch.

By means of electron microscopy the present inventors have established that the layer thickness (i.e. the thickness in Z direction) of the starch phase may be from 0.1-50 µm, and the thickness of the polyolefin layers may be from 0.1-50 µm. Preferably the layers are at most 20 µm, more preferably at most 10 µm.

Figure 2:
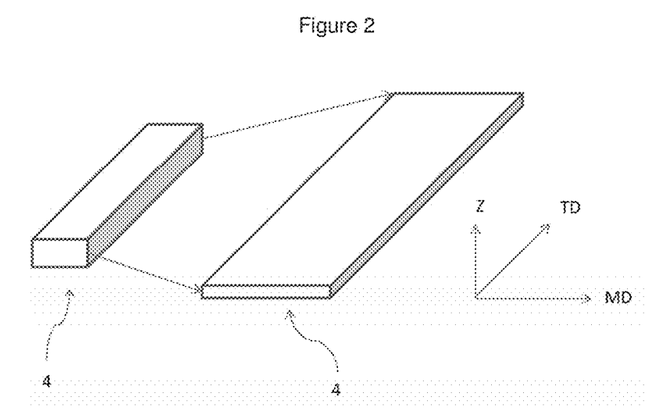
FIG. 2 schematically shows a method for producing the article according to the present invention.
Figure 3A:
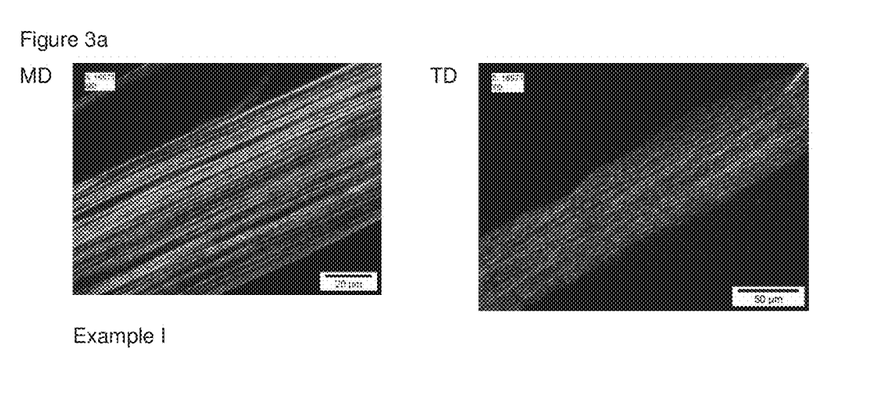
FIGS. 3a to 3h shows SEM photographs of examples I to VIII respectively both in machine direction and transverse direction.
Figure 3B:
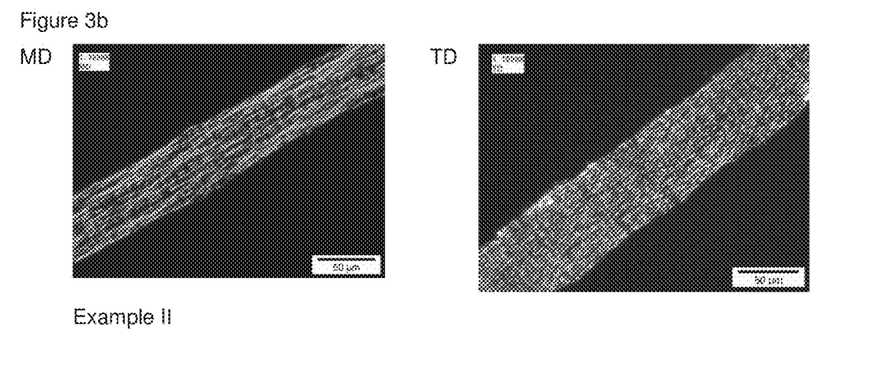
Figure 3C:
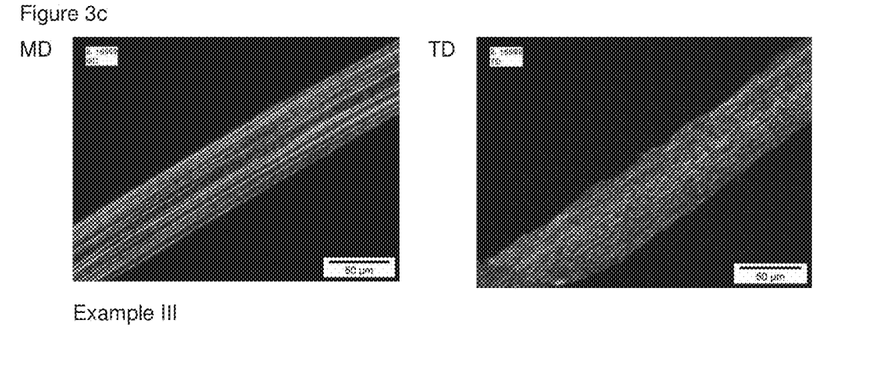
Figure 3D:
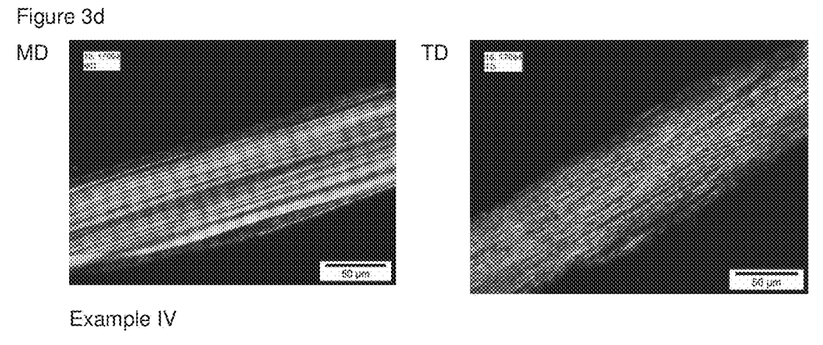
Figure 3E:
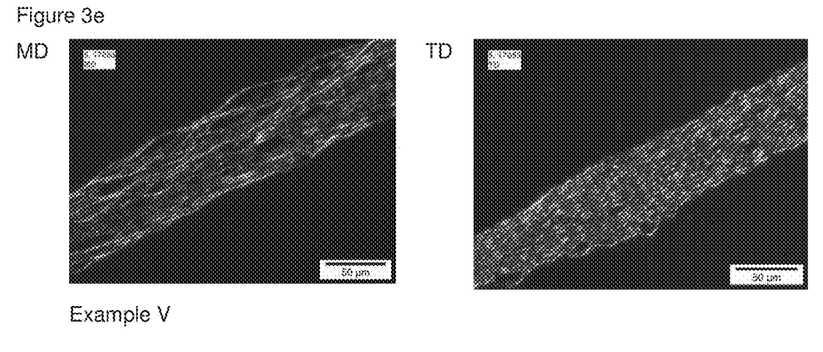
Figure 3F:
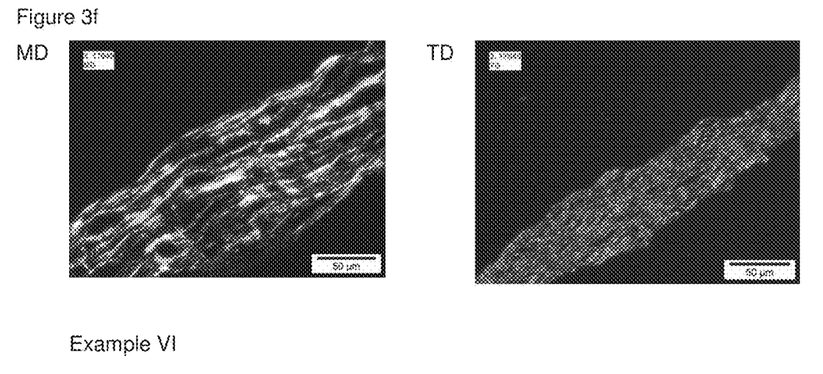
Figure 3G:
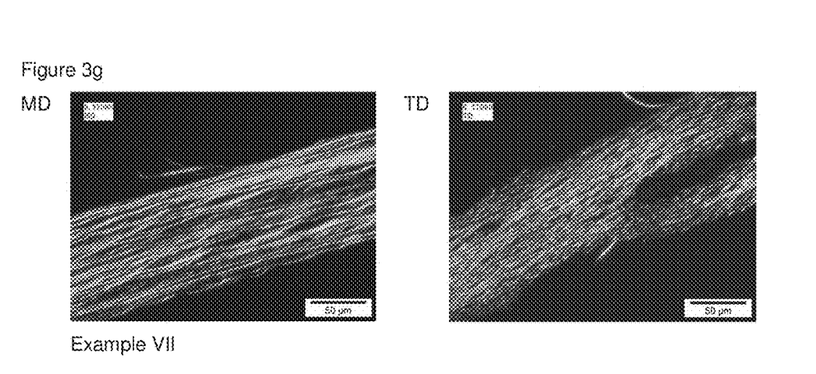
Figure 3H:
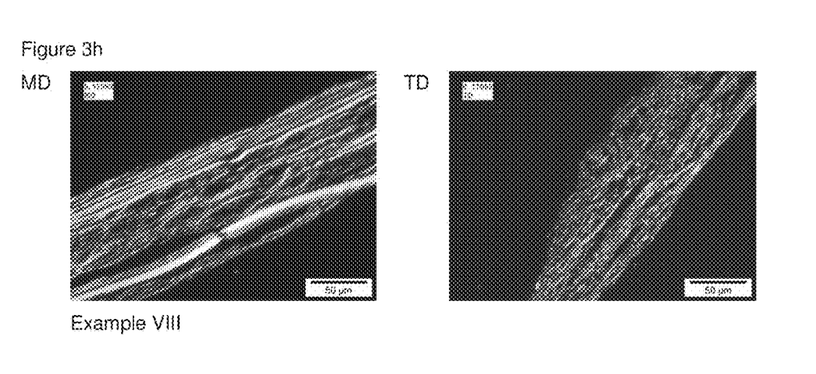

FIG. 2 schematically shows the stretching in machine and transverse direction for producing the article according to the present invention. Volume element 4 having a certain width in transverse direction, a certain length in machine direction (MD) and thickness in thickness direction is bi-axially stretched, meaning it is stretched in machine direction and transverse direction. As a consequence of the stretching in machine direction and transverse direction the thickness in thickness direction Z will decrease. Article 1 of the present invention is not a foam and consequently the density of volume element 4 remains substantially unchanged upon the stretching in machine and transverse direction. In the embodiment where the article of the present invention is manufactured by means of film blowing the stretch ratio in machine direction is equal to the ratio of take up speed of the blown film and the speed of the extrudate leaving the extrusion die. Such has been defined as ratio for "draw down" in U.S. Pat. No. 5,082,616 for example.

EXAMPLES I-XII

An overview of the examples I-XII can be found in Table 1 below.

FIGS. 3a to 3h show SEM photographs of Examples I to VIII in both machine direction (MD) and in transverse direction (TD).

The polyester was Ecoflex F blend C1200, commercially available from BASF, having an MFI at 190° C. and 2.16 kg of between 2.4 and 4.5 g/10 min. The LDPE was Nexcoat 5, commercially available from SABIC having an MFI of about 5 g/10 min as measured according to ISO 1133 at 190° C. and 2.16 kg and having a density of about 919 kg/m$^3$. The compatibiliser was a partially (+/−40%) hydrolysed and saponified polyvinylacetate. Native starch was purchased from Emsland Group.

Further additives are summarised under "other".

The thermoplastic composition forming the basis of the article according to the present invention was prepared by feeding the components to a first zone of a twin screw co-rotating extruder. The temperature profile of the extruder was 30-60-110-160-160-110° C. at a screw speed of 80 rpm and a torque of 60-110 Nm. The thermoplastic starch was formed in the first zones of the extruder before the polyolefin started to melt. To avoid degradation and or yellowing of the starch the temperature of the last zone of the extruder including the extrusion die was reduced to about 110° C. The starch was used as such, i.e. it was not dried or otherwise treated before feeding to the extruder.

The thermoplastic composition was blown to a film by known method, using a stretch ratio in machine direction of 2 and a stretch ratio in transverse direction of 6.

Examples I, III, IV and VII all show a layered morphology, where the present inventors note that the morphology of Example VII shows some irregularities in comparison with the Examples I, III and IV. The present inventors suspect that the sample was damaged during preparation for SEM analysis.

Examples I and IV both show good values for the oxygen and water vapour permeability. Example III fails the water vapour test despite its layered structure. The present inventors believe that the amount of LDPE is too small in this Example. The predominant layers will therefore be formed by the polyester material, which in itself has a higher water vapour permeability than LDPE.

Example VII shows that even with relatively low amount of compatibiliser it is still possible to obtain a layered morphology with alternating layers of starch phase and polyolefin phase, said layers of starch phase and polyolefin phase extending in machine direction and transverse direction.

TABLE 1

|  | I | II (comp) | III | IV | V (comp) | VI (comp) | VII | VIII | IX | X | XI (comp) | XII (comp) |
| --- | --- | --- | --- | --- | --- | --- | --- | --- | --- | --- | --- | --- |
| Polyester | 37.5 | 53.6 | 48.2 | 32.1 | 54.5 | 58.5 | 35.1 | 32.7 | 32.1 | 26.8 | 37.5 | 38 |
| LDPE | 16.1 | 0 | 5.4 | 21.4 | 0 | 0 | 23.4 | 21.8 | 21.4 | 26.8 | 25 | 25.4 |
| Starch | 24 | 24 | 24 | 24 | 24 | 24 | 24 | 24 | 24 | 24 | 24 | 24 |
| Compatibiliser | 8.9 | 8.9 | 8.9 | 8.9 | 8.9 | 4.5 | 4.5 | 8.9 | 8.9 | 8.9 | 0 | 0 |
| Glycerol | 10.7 | 10.7 | 10.7 | 10.7 | 10.7 | 10.7 | 10.7 | 10.7 | 10.7 | 10.7 | 10.7 | 10.7 |

TABLE 1-continued

|  | I | II (comp) | III | IV | V (comp) | VI (comp) | VII | VIII | IX | X | XI (comp) | XII (comp) |
|---|---|---|---|---|---|---|---|---|---|---|---|---|
| Other | 2.8 | 2.8 | 2.8 | 2.8 | 1.9 | 2.3 | 2.3 | 1.9 | 2.8 | 2.8 | 2.8 | 1.9 |
| Morphology | Layered | Partially layered | Layered | Layered | Partially layered | Not layered | Layered | Not layered |  |  |  |  |
| $O_2$ Perm. | 5.2 | 19.2 | 2.8 | 2.2 | 22.4 | 24 | 27.5 | 33 | 8 | 44.5 | 109 | 123 |
| $H_2O$ Perm. | 9.8 | Fail | Fail | 9.7 | Fail | Fail | 7 | Fail | 8 | 5.9 |  | 15.8 |

EXAMPLES XIII, COMPARATIVE EXAMPLE XIV AND EXAMPLE XV

Three further experiments were performed with recipes as per Table 2.

The polyester was the same as in Examples I-XII above. The compatibiliser of Example XIII was the same as in Examples I-XII above. The compatibiliser in Example XV was Lotader 3410, commercially available from Arkema. Lotader 3410 is a random terpolymer of ethylene, butyl acrylate and maleic anhydride. The starch was purchased from Avebe.

TABLE 2

| Component | XIII | XIV | XV |
|---|---|---|---|
|  |  | Weight % |  |
| Polyester | 32.2 | 37.5 | 35.1 |
| LDPE 2404TN00 | — | 25.1 | 23.0 |
| LDPE Nexcoat | 21.4 | — | — |
| Starch (Emsland) |  |  |  |
| Starch (Avebe) | 23.9 | 23.9 | 23.9 |
| Compatibiliser | 8.9 | — | 4.5 |
| Glycerol | 10.7 | 10.7 | 10.7 |
| Other | 2.8 | 2.8 | 2.8 |
| Impact [g/μm] | 2.2 | 0.5 | 3.6 |
| (Monsanto Dart, ASTM D1709A) |  |  |  |
| Tear strength [kJ/m$^2$] |  |  |  |
| Perpendicular | 121 | 16 | 148 |
| Parallel | 28 | 5 | 69 |
| (Elmendorf method, ASTM D1922/ISO 6383-2) |  |  |  |
| Tensile (23° C., 200 mm/min) Transverse direction |  |  |  |
| Stress @ Yield [MPa] | — | 2.4 | — |
| Elongation @ Yield [%] | — | 11.9 | — |
| Stress at break [MPa] | 5.7 | 0.7 | 8.9 |
| Strain @ break [%] | 162 | 39 | 419 |
| Tensile (23° C., 200 mm/min) Machine direction |  |  |  |
| Stress @ Yield [MPa] | — | — | — |
| Elongation @ Yield [%] | — | — | — |
| Stress at break [MPa] | 10.6 | 7.6 | 12.3 |
| Strain @ break [%] | 163 | 103 | 288 |

Figure 4A:
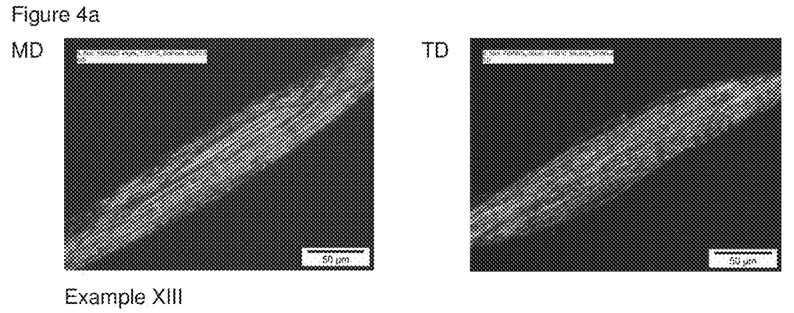
Figure 4B:
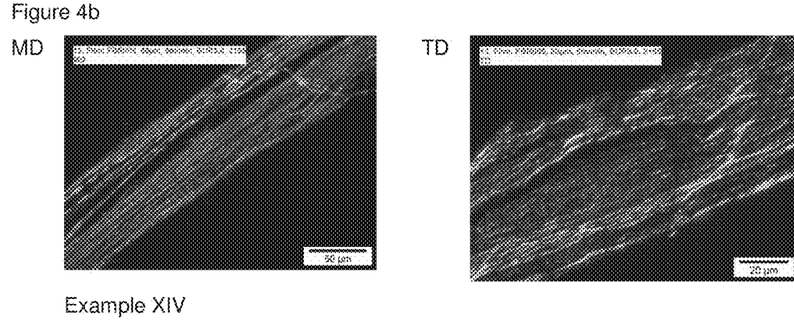
Figure 4C:
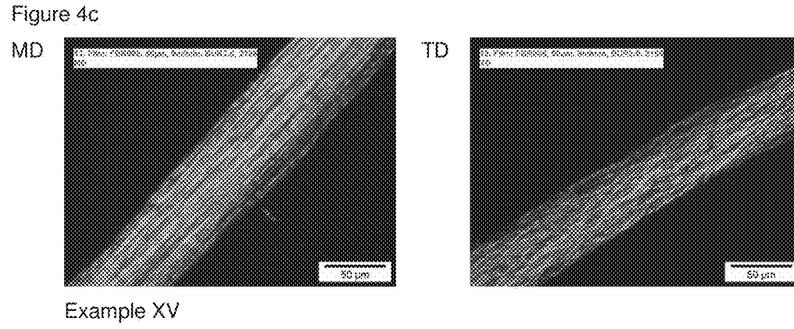

FIGS. 4a to 4c show SEM photographs of Examples XIII, XIV and XV in both machine direction (MD) and in transverse direction (TD).

FIG. 4b, relating to Comparative Example XIV shows an irregular structure wherein the layers delaminate. This is most visible in the picture taken in machine direction (MD). The poor quality of the film of Comparative Example XIV is also deducible from Table 2, which shows that the mechanical properties of the Comparative Example IV film are relatively poor compared to Example XIII and XV.

The invention claimed is:

1. A biaxially stretched article comprising:
   a thermoplastic composition comprising
     a polyolefin phase containing a polyolefin,
     a starch phase containing thermoplastic starch, and
     a compatibiliser,
   wherein the article is obtained by stretching the thermoplastic composition in a machine direction and a transverse direction at elevated temperature to provide a layered morphology with layers of starch phase alternating with layers of polyolefin phase, said layers of starch phase and polyolefin phase extending substantially continuously in the machine direction and the transverse direction, said layers of starch phase comprising less than 5 wt % polyolefin and said layers of polyolefin phase comprising less than 5 wt % starch.

2. The article according to claim 1 wherein the thermoplastic composition comprises
   from 10-70 wt % of the polyolefin,
   from 10-70 wt % of thermoplastic starch, and
   from 5-40 wt % of the compatibiliser
   the weight percentages being based on the weight of the thermoplastic composition.

3. The article according to claim 1 wherein the stretch ratio in machine direction is at most 20 and/or wherein the stretch ratio in transverse direction is at most 4.

4. The article according to claim 1 wherein the compatibiliser is selected from the group consisting of ethylene vinyl acetate copolymers, polyolefins having at least 1 wt % maleic anhydride grafted thereon, ethylene vinyl alcohol copolymers, ethylene acrylic acid copolymers, partially hydrolised and saponified polyvinylacetate, random terpolymers of ethylene, butylacrylate and maleic anhydride or mixtures of at least two of these compatibilisers.

5. The article according to claim 1 wherein the starch phase has an MFI of from 2-20 g/10 min measured at 130° C. under a load of 10 kg as measured in accordance with ISO 1133.

6. The article according to claim 1 wherein the polyolefin phase has an MFI of from 2-20 g/10 min measured at 130° C. under a load of 10 kg as measured in accordance with ISO 1133.

7. The article according to claim 1 wherein the ratio of the MFI of the polyolefin phase and the MFI of the starch phase, both measured at 130° C. under a load of 10 kg as measured in accordance with ISO 1133, is from 0.5-1.5.

8. The article according to claim 1 wherein the compatibiliser is a partially hydrolised and saponified polyvinylacetate.

9. The article according to claim 1 wherein the thermoplastic composition comprises a further compatibiliser being a polyolefin having at least 1 wt % maleic anhydride grafted thereon.

10. The article according to claim 1 wherein the article is a film having a thickness of from 2-250 μm.

11. A multilayer film comprising the film according to claim 10 wherein said film is provided with at least one further synthetic film of a synthetic polymer extending in machine direction and transverse direction.

12. A method for producing an article according to claim 1 comprising
providing a thermoplastic composition comprising a polyolefin, thermoplastic polyester, thermoplastic starch and a compatibiliser and feeding said thermoplastic composition to an extruder, extruding the thermoplastic composition through an extrusion die and stretching the thermoplastic composition upon exiting the extrusion die at elevated temperature in machine direction and transverse direction,
or
feeding a polyolefin or a mixture of two or more polyolefins, thermoplastic polyester, starch, a processing aid for making thermoplastic starch and a compatibiliser to an extruder, extruding these components under such conditions that a thermoplastic composition comprising a polyolefin, thermoplastic polyester thermoplastic, starch and a compatibiliser is formed in the extruder and stretching the thermoplastic composition upon exiting the extruder via an extrusion die at elevated temperature in machine direction and transverse direction.

13. The article according to claim 1, wherein the article is an oxygen and water vapour diffusion barrier layer.

14. The article according to claim 1 wherein the thermoplastic polyester is present in an amount of from 20 to 60 weight %.

15. The article according to claim 10 wherein the film has a modulus of at least 50 MPa as measured according to ASTM 882 and an elongation at break of at least 200% as measured according to ISO 527-3.

16. The article according to claim 14, wherein the thermoplastic polyester is poly(butylene terephthatate-co-adipate).

17. The article according to claim 1 having
a stretch ratio in transverse direction of at least 1.5 the stretch ratio in transverse direction being defined as:

$$SR_{td} = \frac{W_1}{W_0}$$

and a stretch ratio in machine direction of at least 2, the stretch ratio in machine direction being defined as:

$$SR_{md} = \frac{T_0}{T_1 \times SR_{td}}$$

wherein
$SR_{md}$ =Stretch ratio in machine direction,
$SR_{td}$ =Stretch ratio in transverse direction,
$W_0$ =Width of the thermoplastic composition before stretching in transverse direction,
$W_1$ =Width of the biaxially stretched article,
$T_0$ =Thickness of the thermoplastic composition before stretching in machine and transverse direction, and
$T_1$ =Thickness of the biaxially stretched article.

* * * * *